United States Patent [19]

Kim

[11] Patent Number: 5,568,292
[45] Date of Patent: Oct. 22, 1996

[54] POSITION-SENSITIVE LIQUID CRYSTAL DISPLAY AND PROCESS FOR PRODUCING THE SAME

[75] Inventor: Jeong J. Kim, Seoul, Rep. of Korea

[73] Assignee: Goldstar Co., Ltd., Seoul, Rep. of Korea

[21] Appl. No.: 554,106

[22] Filed: Nov. 6, 1995

Related U.S. Application Data

[63] Continuation of Ser. No. 118,175, Sep. 9, 1993, abandoned.

[30] Foreign Application Priority Data

Sep. 9, 1992 [KR] Rep. of Korea ............................ 16578

[51] Int. Cl.$^6$ ........................ G02F 1/1335; G02F 1/1333
[52] U.S. Cl. ............................. 359/67; 359/68; 345/104
[58] Field of Search .......................... 359/67, 46, 68; 345/104

[56] References Cited

U.S. PATENT DOCUMENTS

| | | | |
|---|---|---|---|
| 4,525,032 | 6/1985 | Hilsum | 350/331 R |
| 4,785,564 | 11/1988 | Gurtler | 40/448 |
| 4,841,290 | 6/1989 | Nakano et al. | 340/707 |
| 4,853,296 | 8/1989 | Fukuyoshi | 428/623 |
| 4,988,168 | 1/1991 | Dickerson et al. | 350/339 F |
| 5,136,404 | 8/1992 | Nobile et al. | 359/52 |
| 5,162,782 | 11/1992 | Yoshioka | 340/712 |
| 5,194,852 | 3/1993 | More et al. | 340/712 |

FOREIGN PATENT DOCUMENTS 4-045481  2/1992  Japan ..................................... 345/104

*Primary Examiner*—William L. Sikes
*Assistant Examiner*—Charles Miller

[57] ABSTRACT

A position-sensitive liquid crystal display applicable to a thin input-output pad utilized for a pen-based computer is disclosed, which employs the liquid crystal display endowed with a position-sensitive function and a simple process for producing the same, exclusive of superimposing the liquid crystal display on a position-sensitive device. The position-sensitive liquid crystal display includes an upper substrate having a position-sensitive device therein, a lower substrate joined with the upper substrate and a liquid crystal injected between the upper and the lower substrates. The process for producing the same omits the step of joining the liquid crystal display with the position-sensitive device and is thus simple.

7 Claims, 6 Drawing Sheets

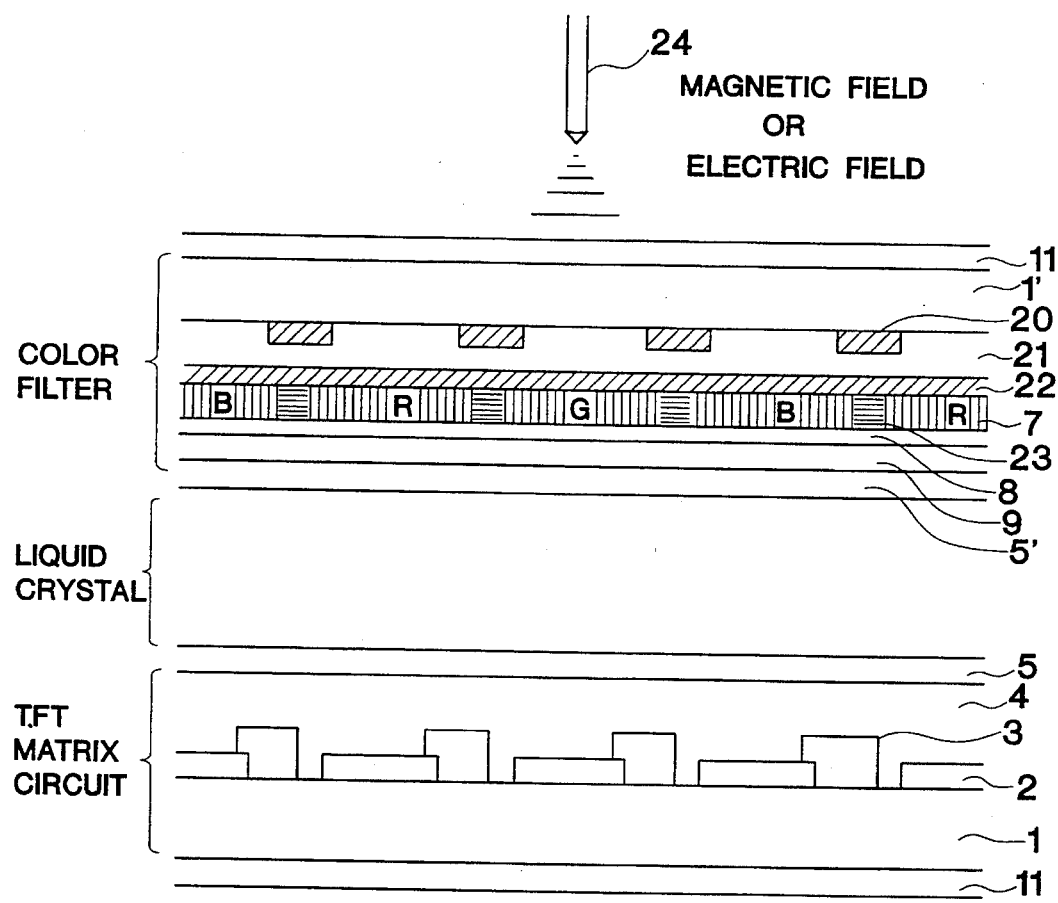

POSITION-SENSITIVE LIQUID CRYSTAL DISPLAY AND PROCESS FOR PRODUCING THE SAME

This application is a continuation of application Ser. No. 08/118,175 filed on Sep. 9, 1993, now abandoned.

BACKGROUND OF THE INVENTION

1. Field of the Invention

The present invention relates in general to a liquid crystal display and a process for producing the same, and more particularly to a position-sensitive liquid crystal display applicable to various fields, especially to a thin input-output pad utilized for a pen-based computer or an electronic pocket notebook, which employs the liquid crystal display endowed with a position-sensitive function and a simple process for producing the same, exclusive of superimposing the liquid crystal display on a position-sensitive device.

2. Description of the Background Art

A conventional liquid crystal display, as the sectional view thereof is shown in FIG. 1, consists of a lower substrate, an upper substrate joined with the lower substrate and a liquid crystal.

The lower substrate comprises a polarizing screen 11 deposited on the lower surface 1 of a glass substrate, a pattern of a transparent picture element electrode 2 and a plurality of thin film transistors 3 formed on the glass substrate 1, a protective film 4 deposited over the pattern of transparent picture element electrode and the film transistors 3, and an error aligning layer 5 deposited, in sequence, on the protective film 4.

The upper substrate comprises the other polarizing screen 11 deposited on a glass substrate 1', a pattern of a black matrix formed on the lower surface of the glass substrate 1', a polyimide layer-coating color filter formed over the lower surfaces of the patterned black matrix, an adhesive layer formed on the lower surface of the color filter, a transparent counter electrode and an error aligning layer deposited, in sequence, on the lower surface of the adhesive layer.

The liquid crystal is injected between the lower substrate and the upper substrate.

Next, referring to FIG. 2, the description is given in detail for the conventional process of the production of the above liquid crystal display. Firstly, in step A, there is provided a glass substrate 1 on which a layer of transparent picture element electrode 2 is formed by the treatment of vapor-deposition and then is patterned. Thereafter, each of thin film transistors 3 is formed over the pattern of transparent picture element electrode 2.

Step B is undertaken to carry out to substantially finish preparing a lower substrate. For this, there is deposited a protective film 4 which plays a role in protecting a channel. Thereafter, an error aligning layer 5 is deposited on the protective film 4.

Subsequently in step C, a part of a process for preparing an upper substrate is started. The upper substrate is formed of a glass substrate 1'. A black matrix 6 is formed on the surface of the glass substrate 1' by the treatment of vapor deposition and then patterned in a desired shape. Thereafter, over the pattern of black matrix 6 is deposited a color filter 7 which allows red, green and blue colors to be expressed.

Step D is undertaken to carry out to substantially finish preparing the upper substrate. Initially, an adhesive layer 8 is applied to the color filter 7, Subsequently, a transparent counter electrode 9 and another error aligning layer 5' are deposited on the adhesive layer 8 in sequence.

Lastly in step E, a whole conventional liquid crystal display is produced. The lower substrate and the upper substrate are joined together in such a manner that the substrates 1 and 1' are directed toward the outside, respectively. A liquid crystal 10 is injected between the lower substrate and the upper substrate. Thereafter, a polarizing screen 11 is deposited on the outside-directed surfaces of the lower glass substrate 1 and the other polarizing screen 11 is deposit, ed on the outside-directed surface of the upper glass substrate 1'.

In the liquid crystal display that is produced by such a conventional process, the structure of the black matrix 6 that is formed in the upper substrate is given as shown in FIG. 3.

An image is displayed on the conventional liquid crystal display by a scanning signal and a video signal. In detail, each of the thin film transistors 3, which constitutes a picture element together with the patterned transparent picture element electrode 2, is selected by the scanning signal with generating the video signal. This video signal charges the patterned transparent picture element electrode 2, so that an electric potential difference is generated between the patterned transparent picture element electrode 2 of the lower substrate and the transparent counter electrode 9 of the upper substrate. As a result, depending on the difference, polarization of the liquid crystal is generated, which then permits a back light to pass through the liquid crystal 10. The polarized light further passes through the color filter 7 corresponding to each of the transparent picture element electrodes 2 and displays a color with a specific luminance.

However, the above-illustrated, conventional liquid crystal display performs only the function of display. Particularly, in case of a pen-based computer, an input and output is directly performed on a display element while using a pen. Accordingly, a conventional pen-based computer employs a pert input-output pad which is formed by superimposing the liquid crystal display, an output element, on a position-sensitive device, and an input element. However, this superimposition not only makes the input-output pad thick but also requires a technique for joining the two elements and adjusting for the joining. In addition, there is another problem in that a lower yield may result due to an error in joining the two elements together.

SUMMARY OF THE INVENTION

For solving the above problems, the present inventors have recognized that there exists a need for a liquid crystal display capable of performing a position-sensitive function, and for a simple production process which is exclusive of a technique for joining a liquid crystal display on a position-sensitive device.

According to one aspect of the present invention, there is provided a position-sensitive liquid crystal display applicable to a pen input-output pad which is made thin therewith, According to another aspect of the present invention, there is provided a process for the production of the position-sensitive liquid crystal display, which is simple and effective without employing the joining technique.

In accordance with the present invention, the position-sensitive liquid crystal display comprises a lower substrate, an upper substrate joined with the lower substrate and a liquid crystal. The lower substrate comprises a polarizing screen deposited on the lower surface of a glass substrate, a patterned transparent picture element electrode a plurality of thin film transistors formed on the glass substrate, a protective film deposited over the patterned transparent picture element electrode and the thin film transistors, and an error aligning layer deposited on the protective film. The upper substrate comprising a polarizing screen deposited on the other glass substrate, a patterned Y-directional grid wire formed on the lower surface of the glass substrate, an insulating layer formed over the lower surfaces of the patterned Y-directional grid wires, a patterned X-directional grid wire formed on the lower surface of the insulating layer, a polyimide layer-coating color filter formed over the lower surfaces of the patterned X-directional grid wire, an adhesive layer formed on the lower surface of the color filter, a transparent counter electrode and an error aligning layer deposited, in sequence, on the lower surface of the adhesive layer, and the liquid crystal being injected between the lower substrate and the upper substrate.

Process according to the another aspect of the present invention comprises the steps of depositing a metal layer on the surface of a glass substrate, patterning the metal layer in a desired shape to form a pattern of transparent picture element electrodes, forming a plurality of thin film transistors over the pattern of transparent picture element electrodes, depositing a protective film and an error aligning layer, in sequence, over the thin film transistors to prepare a lower substrate, depositing a Y-directional grid wire layer on the other glass substrate, patterning the Y-directional grid wire layer in a desired shape, depositing an insulating layer and an X-directional grid wire layer over the pattern of Y-directional grid wire, patterning the X-directional grid wire layer in a desired shape to form a pattern, forming a color filter coated with a polyimide layer over the pattern of X-directional grid wire, forming an adhesive layer on the color filter, depositing a transparent counter electrode and an error aligning layer, in sequence, on the adhesive layer to form an upper substrate, joining the lower substrate and the upper substrate together in such a manner that the two glass substrates are directed toward the outside, respectively, injecting a liquid crystal between the lower substrate and the upper substrate, and depositing two of a polarizing screen on each the outside-directed surfaces of the two glass substrates, respectively.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

The present invention will become more fully understood from the detailed description given hereinbelow and the accompanying drawings which are given by way of illustration only, and, thus, are not limitative of the present invention, and wherein

FIG. 5 is a schematic, sectional view showing the position-sensitive liquid crystal display according to the present invention;

DETAILED DESCRIPTION OF THE PREFERRED EMBODIMENTS

Figure 1:
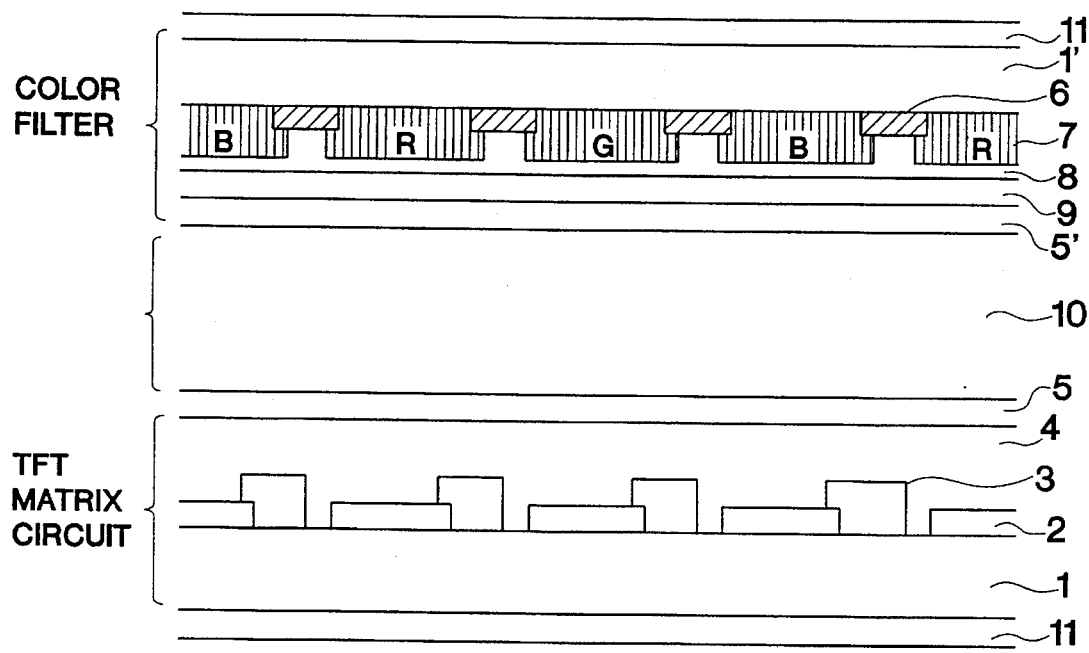
FIG. 1 is a schematic, sectional view showing a prior art liquid crystal display.
Figure 3:
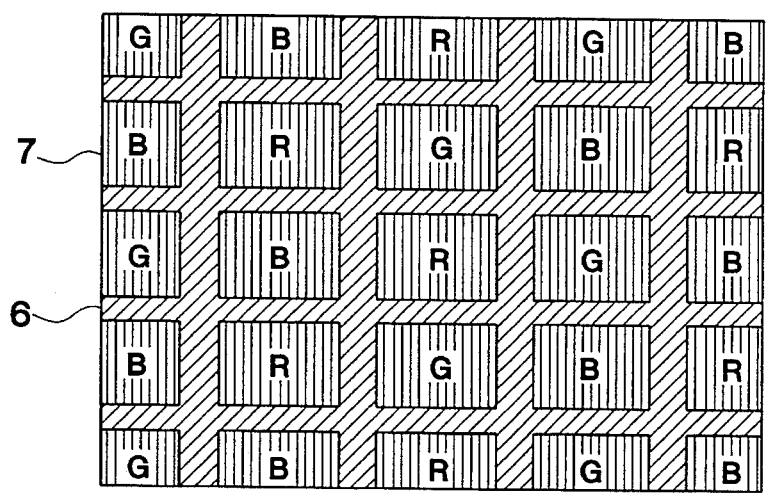
FIG. 3 is a plan view showing the structure of a black matrix in an upper substrate of FIG. 1.
Figure 2A:
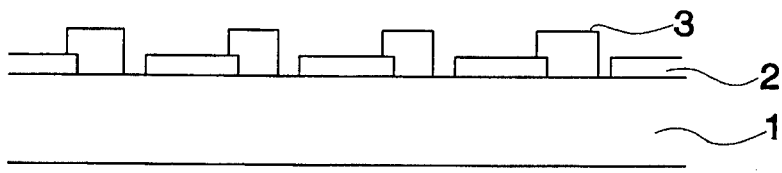
FIGS. 2A–2E are schematic process flow diagrams for producing a prior art liquid crystal display.
Figure 2B:
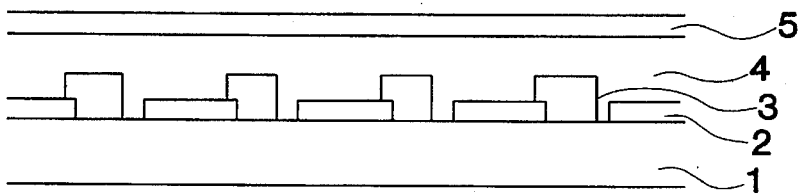
Figure 2C:
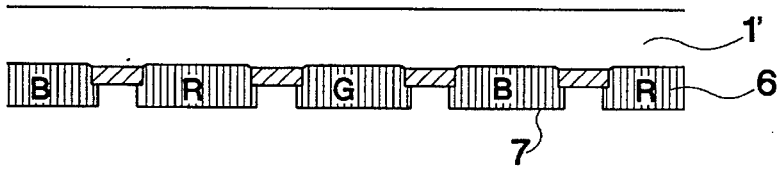
Figure 2D:
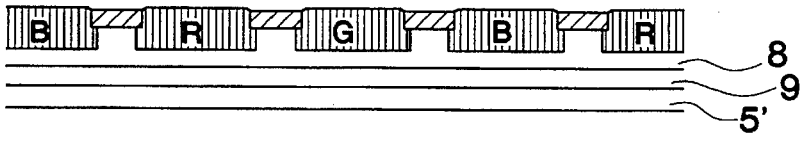
Figure 2E:
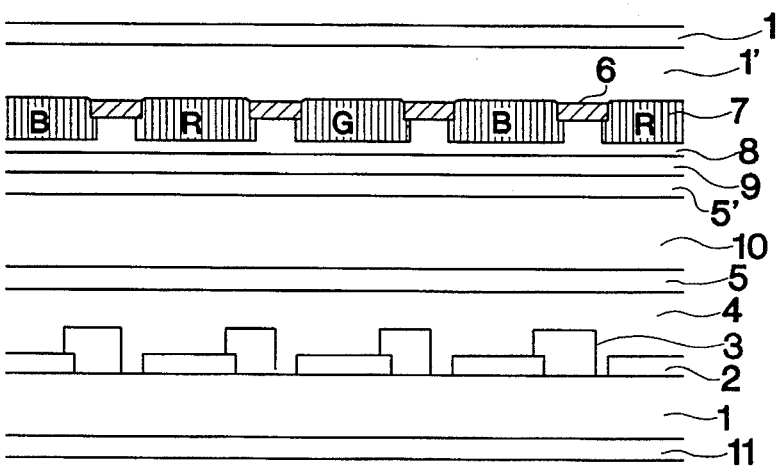
Figure 4A:
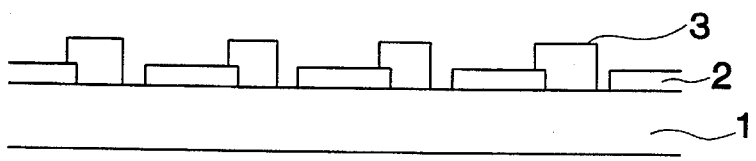
FIGS. 4A–4F are schematic process flow diagrams for producing a position-sensitive liquid crystal display according to the present invention.
Figure 4B:
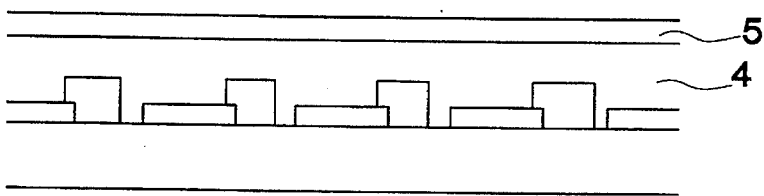
Figure 4C:
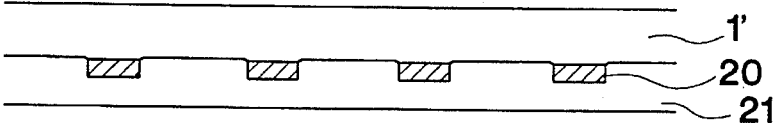
Figure 4D:
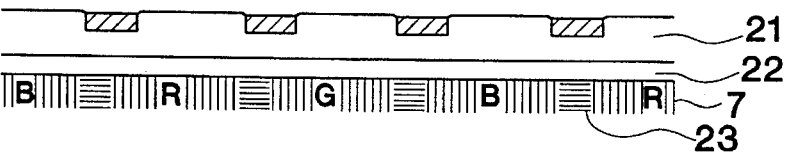
Figure 4E:
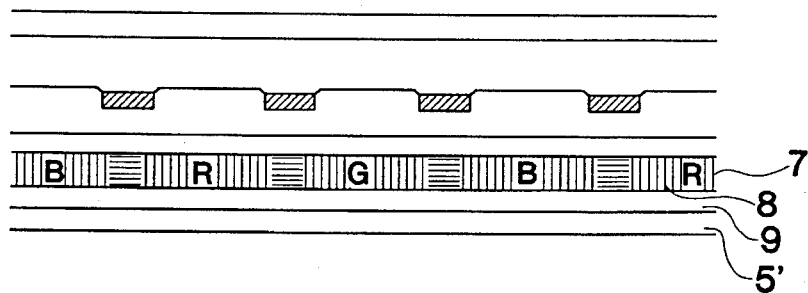
Figure 4F:
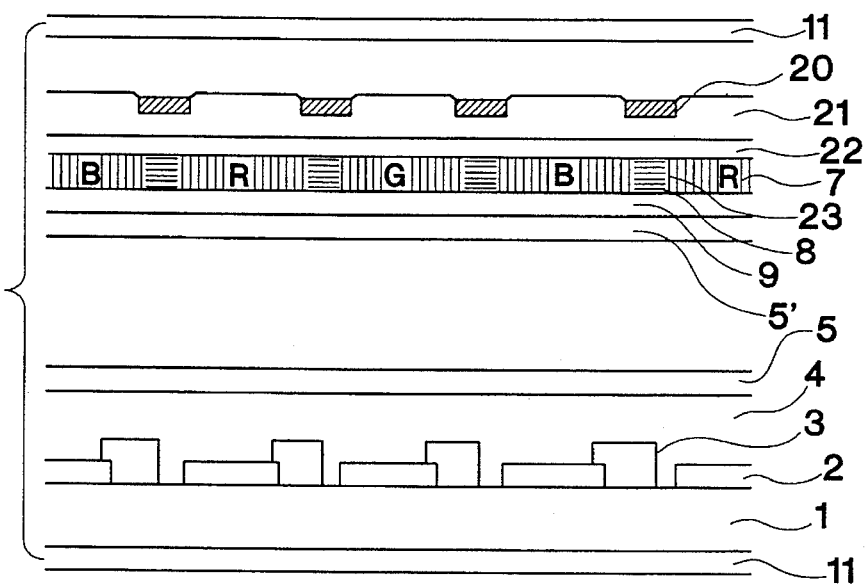

Turning now of FIGS. 4A–4F, there is illustrated a process flow for a position-sensitive liquid crystal display in accordance with the present invention. The description is given in detail for the inventive process for producing the position-sensitive liquid crystal display, referring to the drawings.

First, in step A, a lower substrate is formed of a washed glass substrate 1. A layer of transparent picture element electrodes 2, which acts as a picture element, is formed on the surface of the glass substrate 1 by the treatment of vapor-deposition and then patterned in a desired shape. Thereafter, a plurality of thin film transistors 3 are formed over the patterned transparent picture element electrode 2.

Step B is undertaken to substantially finish preparing the lower substrate. For this, there is deposited a protective film 4 which functions as the protection of a channel, over the thin film transistors 3 and the patterned transparent picture element electrodes 2. Subsequently, an error aligning layer 5 is deposited on the protective film 4 in order to enlarge a margin.

Next, in step C, a part of a process for preparing an upper substrate is started and initially for a position-sensitive device. The upper substrate is formed of a glass substrate 1'. A Y-directional grid wire 20 which acts as a black matrix is formed on the surface of the glass substrate by the treatment of vapor deposition and then patterned in a desired shape. Thereafter, over the pattern of the Y-directional grid wire 20 is deposited an insulating layer 21.

Step D is undertaken to set a position-sensitive device in the upper substrate. Initially, an X-directional grid wire 22 is formed on the insulating layer 21. In sequence, there is formed a color filter 7 applied with a polyimide layer 23 on the pattern of the X-directional grid wire 22 in order to allow red, green and blue colors to be expressed.

Step E is undertaken to substantially finish preparing the upper substrate. An adhesive layer 8 is formed on the color filter 7, and a transparent counter electrode 9 and an error aligning layer 5' are deposited, in sequence, on the adhesive layer 8.

Lastly in step E, the position-sensitive liquid crystal display according to the present invention is finally produced. The lower substrate and the upper substrate are joined together in such a manner that the substrates 1 and 1' are directed toward the outside, respectively. A liquid crystal 10 is injected between the lower and the upper substrates. Thereafter, two of a polarizing screen 11 are deposited on the outside-directed surfaces of the lower glass substrates 1 and the upper glass substrate 1', respectively.

FIG. 5 is a sectional view illustrating the structure of the position-sensitive liquid crystal display produced by the above described process. As shown in FIG. 5, the position-sensitive liquid crystal display comprise a lower substrate, a liquid crystal, and an upper substrate joined with the lower substrate.

The lower substrate comprises a polarizing screen 11 deposited on the lower surface of a glass substrate 1, a patterned transparent picture element electrode 2 and a plurality of thin film transistors 3 formed on the glass substrate 1, a protective film 4 deposited over the patterned transparent picture element electrode 2 and the thin film transistors 3, and an error aligning layer 5 deposited on the protective film 4.

The upper substrate comprises another polarizing screen 11 deposited on a glass substrate 1', a patterned Y-directional grid wire 20 formed on the lower surface of the glass substrate 1', an insulating layer 21 formed over the lower surfaces of the patterned Y-directional grid wire 20, a patterned X-directional grid wire 22 formed on the lower surface of the insulating layer 21, a polyimide layer-coating color filter 7 formed over the lower surfaces of patterned X-directional grid wire 22, an adhesive layer 8 formed on the lower surface of the color filter 7, a transparent counter electrode 9 and an error aligning layer 5' deposited, in sequence, on the lower surface of the adhesive layer 8.

Thereafter, the liquid crystal is injected between the lower substrate and the upper substrate.

Figure 6:
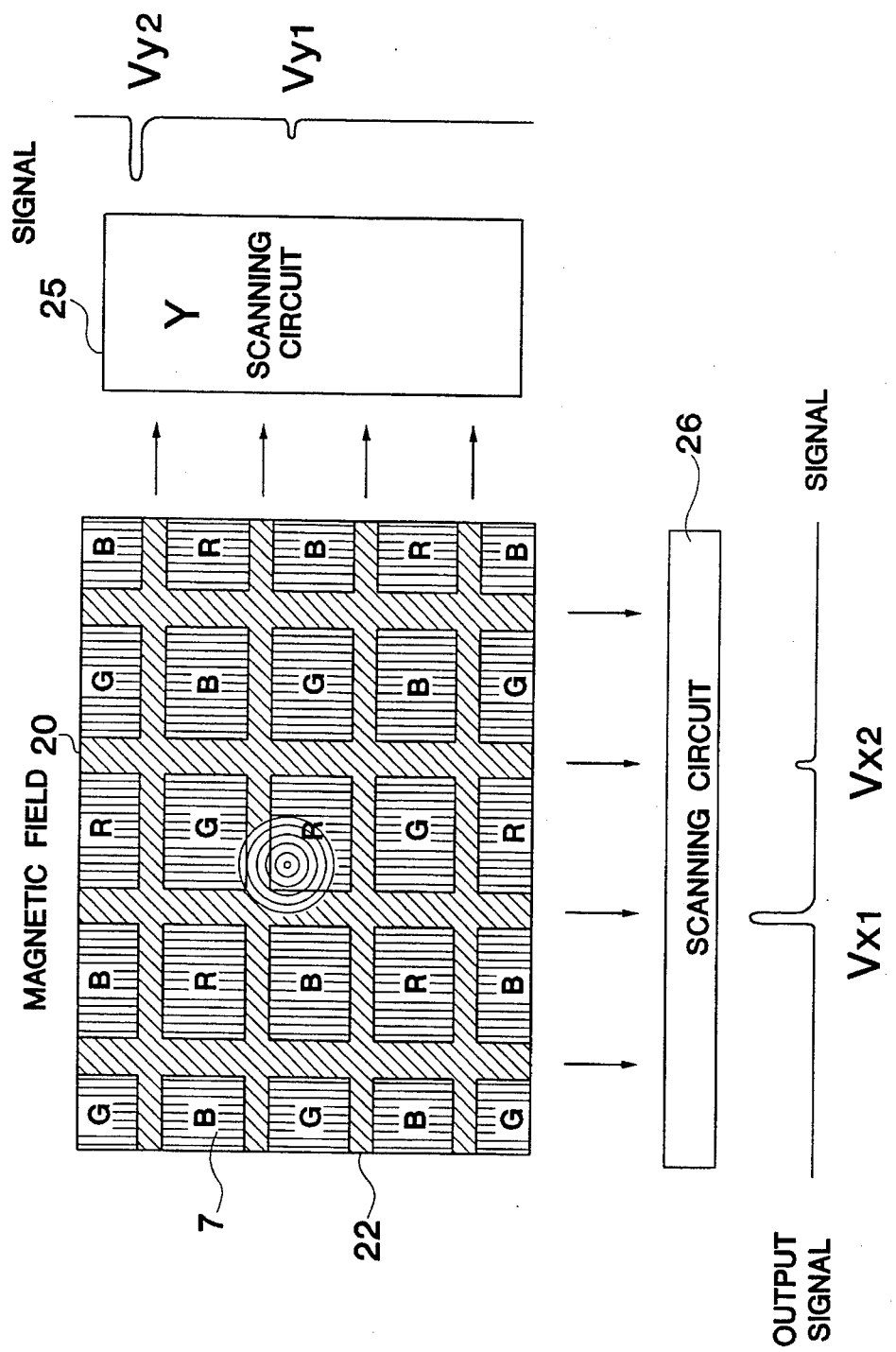
FIG. 6 is a plan view for X-directional arid Y-directional grid wire performing a position-sensitive function in the position-sensitive liquid crystal display of FIG. 5.

FIG. 6 shows the structure of the color filter 7, the X-directional grid wire 22 and the Y-directional grid wire 20 in a plan view. The X-, Y-directional grid wire 22 and 20 act as black matrixes and sensors for detecting a magnetic field or an RF electric field transferred from a stylus pen as shown in FIG. 5.

The effects and operation of the position-sensitive liquid crystal display according to the present invention will be more apparent as the following description proceeds, referring to FIGS. 5 and 6.

As shown in FIG. 5, the magnetic field or RF electric field generated from the stylus pen 24 is transferred to the upper substrate. The transferred magnetic field or electric field generates electric currents at the X-, Y-directional grid wires 22 and 20. At this time, X-,Y-directional scanning signal sensors 26 and 25, as shown in FIG. 6, sense the electric currents generated at the X-,Y-directional grid wires 20 and 22, respectively. As a result, voltages ($V_{X1}$, $V_{X2}$) are generated by the X-directional scanning sensor 26. On the other hand, voltages ($V_{Y1}$, $V_{Y2}$) are generated in the Y-directional scanning sensor 25. X, Y coordinates may be calculated from the output voltages ($V_{X1}$, $V_{X2}$) and ($V_{Y1}$, $V_{Y2}$).

Figure 7:
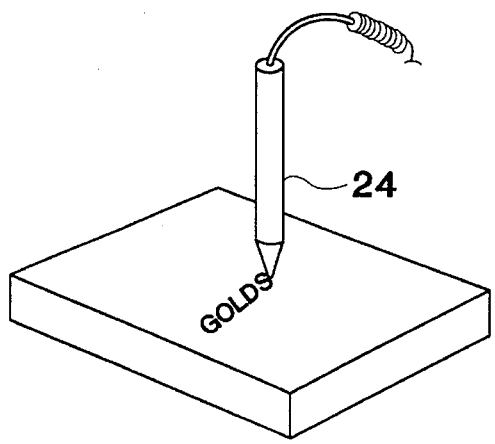
FIG. 7 is an operational diagram for a position-sensitive liquid crystal display according to the present invention.

The calculated X and Y coordinates are then transferred to the thin film transistors 3 and the patterned transparent picture element electrodes 2 via a line of a scanning signal and a video signal in the lower substrate. Subsequently, the video signal comes to charge the transparent picture element electrodes 2, so that an electric potential difference is generated between the transparent picture element electrodes 2 of the lower substrate and the transparent counter electrode 9 of the upper substrate. As a result, depending on the potential difference, polarization of the liquid crystal is generated, which then permits a back light to pass through the liquid crystal. The polarized light further passes through the color filter 7 corresponding to each of the transparent picture element electrodes and displays a color with a specific luminance. This, as shown in FIG. 7, is displayed on a liquid crystal display containing position-sensitive device therein as if a letter were written on paper.

In accordance with the present invention, as illustrated above, a liquid crystal display has very wide application by endowing the liquid crystal display with a position-sensitive function. In addition, the position-sensitive liquid crystal display according to the present invention is thinner than a conventional pen input-output pad, which is formed by merely superimposing a liquid crystal display on position-sensitive device, and is as small as a liquid crystal display. Furthermore, the process for producing the inventive position-sensitive liquid crystal display is exclusive of the technique for joining the liquid crystal display and position-sensitive device together, which is requisite for a conventional process, so that the inventive process is more simple. Moreover, there is removed any error which may result from the joining technique and thus, a yield may be improved. The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A position-sensitive liquid crystal display comprising:
   a lower glass substrate;
   an upper glass substrate;
   a plurality of transparent pixel electrodes formed on said lower glass substrate;
   a plurality of thin film transistors associated with said transparent pixel electrodes formed on said lower glass substrate;
   a position-sensitive layer formed on said upper glass substrate as a black matrix wherein said position-sensitive layer includes a plurality of X-directional grid wires, a plurality of Y-directional grid wires and an insulating layer therebetween;
   a color filter formed directly on said X-directional grid wires of said position-sensitive layer; and
   a liquid crystal material interposed between said lower glass substrate and said upper glass substrate.

2. The position-sensitive liquid crystal display of claim 1, further comprising:
   a first polarizing screen applied to a surface of said upper glass substrate; and
   a second polarizing screen applied to a surface of said lower glass substrate,
   wherein said first and second polarizing screens form top and bottom surfaces of the position-sensitive liquid crystal display, respectively.

3. The position-sensitive liquid crystal display of claim 2, wherein said color filter is coated with a polyamide layer, said color filter having a plurality of color regions for displaying color.

4. The position-sensitive liquid crystal display of claim 3, wherein said plurality of X-directional grid wires and said plurality of Y-directional grid wires are arranged so as to define a plurality of areas, said plurality of areas directly corresponding with the plurality of color regions of said color filter.

5. The position-sensitive liquid crystal display of claim 4, further including:
   an adhesive layer, a transparent counter electrode layer, and a first error aligning layer, sequentially applied to said color filter; and
   a protective film and then a second error aligning layer deposited over said plurality of thin film transistors, wherein said liquid crystal material is injected between the first and second error aligning layers.

6. The position-sensitive liquid crystal display of claim 5, further including means for processing signals generated from said position-sensitive layer to determine which portion of the liquid crystal display is being selected.

7. A process for producing a position-sensitive liquid crystal display, comprising the steps of:

depositing a metal layer on the surface of a first glass substrate;

patterning said metal layer in a desired shape to form a pattern of transparent picture element electrodes;

forming a plurality of thin film transistors over said pattern of transparent picture element electrodes;

depositing a protective film and a first error aligning layer, in sequence, over said plurality of thin film transistors to prepare a lower substrate;

depositing a Y-directional grid wire layer on a second glass substrate;

patterning the Y-directional grid wire layer in a desired shape;

depositing an insulating layer and then an X-directional grid wire layer, over said patterned Y-directional grid wire layer;

patterning the X-directional grid wire layer in a desired shape so as to provide a function of a black matrix in combination with the patterned Y-directional grid wire layer;

forming a color filter coated with a polyimide layer directly on said patterned X-directional grid wire layer;

forming an adhesive layer on said color filter;

depositing a transparent counter electrode and a second error aligning layer, in sequence, on said adhesive layer to form an upper substrate;

joining said lower substrate and said upper substrate together in such a manner that said first and second glass substrates are directed toward an outside of said position-sensitive liquid crystal display, respectively;

injecting a liquid crystal material between said lower substrate and said upper substrate; and depositing a polarizing screen on each of the outside-directed surfaces of said first and second glass substrates, whereby said patterned Y-directional grid wire layers, said patterned X-directional grid wire layer, and said insulating layer therebetween form a position-sensitive device.

* * * * *